(12) United States Patent
Downie et al.

(10) Patent No.: US 11,260,326 B2
(45) Date of Patent: Mar. 1, 2022

(54) MAGNETIC ROD GUIDE FOR A FILTER

(71) Applicant: ADEY HOLDINGS (2008) LIMITED, Stonehouse (GB)

(72) Inventors: Simon Downie, Cheltenham (GB); Kashem Pathan, Worcester (GB); Robert Albrow, Malvern (GB)

(73) Assignee: ADEY HOLDINGS (2008) LIMITED, Stonehouse (GB)

( * ) Notice: Subject to any disclaimer, the term of this patent is extended or adjusted under 35 U.S.C. 154(b) by 429 days.

(21) Appl. No.: 16/313,964

(22) PCT Filed: Jun. 30, 2017

(86) PCT No.: PCT/GB2017/051947
§ 371 (c)(1),
(2) Date: Dec. 28, 2018

(87) PCT Pub. No.: WO2018/002669
PCT Pub. Date: Jan. 4, 2018

(65) Prior Publication Data
US 2020/0306670 A1    Oct. 1, 2020

(30) Foreign Application Priority Data

Jun. 30, 2016   (GB) ...................... 1611514

(51) Int. Cl.
*B01D 35/06*   (2006.01)
*B03C 1/28*   (2006.01)

(52) U.S. Cl.
CPC .............. *B01D 35/06* (2013.01); *B03C 1/286* (2013.01); *B01D 2201/305* (2013.01);
(Continued)

(58) Field of Classification Search
CPC .. B01D 35/06; B01D 2201/305; B03C 1/286; B03C 1/284; B03C 2201/18;
(Continued)

(56) References Cited

U.S. PATENT DOCUMENTS 2,838,179 A * 6/1958 Thomas ................... B03C 1/28
                                                           210/223
3,034,651 A * 5/1962 Morrell .................... B03C 1/28
                                                           210/222
(Continued)

FOREIGN PATENT DOCUMENTS

CN        104482366 A    4/2015
KR        101576185 B1   12/2015

OTHER PUBLICATIONS

Metal Supermarkets "What is a ferrous metal?" https://www.metalsupermarkets.com (Year: 2019).*

*Primary Examiner* — Liam Royce
(74) *Attorney, Agent, or Firm* — Jacob M. Ward; Ward Law Office LLC

(57) ABSTRACT

A magnetic rod guide for a filter is provided that includes a base for attachment to part of a filter, a through aperture through which a magnetic rod can move, and resilient engagement means. The resilient engagement means includes one or more resilient latches for holding the magnetic rod in one or more fixed positions relative to the guide. Each resilient latch is adapted to allow movement of the magnetic rod through the through aperture in either direction, for insertion into the filter or withdrawal from the filter into one of the fixed positions.

16 Claims, 6 Drawing Sheets

(52) U.S. Cl.
CPC .......... *B03C 1/284* (2013.01); *B03C 2201/18* (2013.01); *B03C 2201/28* (2013.01)

(58) Field of Classification Search
CPC ... B03C 2201/28; B03C 1/288; B03C 1/0332; B03C 1/2888; H01F 7/0221; C02F 1/488; C02F 1/48; F24D 19/0092
See application file for complete search history.

(56) References Cited

U.S. PATENT DOCUMENTS

| | | | |
|---|---|---|---|
| 3,328,746 A * | 6/1967 | Schumacher | H01R 13/5205 439/587 |
| 3,342,335 A * | 9/1967 | Gamundi | B01D 35/00 210/117 |
| 4,319,989 A * | 3/1982 | Wyland | B03C 1/284 137/544 |
| 4,495,068 A | 1/1985 | Rosaen | |
| 5,043,063 A | 8/1991 | Latimer | |
| 5,316,151 A * | 5/1994 | Thompson | B03C 1/284 209/223.1 |
| 5,730,766 A * | 3/1998 | Clements | B01D 46/0005 55/341.1 |
| 6,077,333 A | 6/2000 | Wolfs | |
| 6,251,273 B1 * | 6/2001 | Jawurek | B01D 29/96 210/232 |
| 6,572,069 B1 | 6/2003 | Kotthaus | |
| 8,636,907 B1 | 1/2014 | Lin et al. | |
| 2003/0116494 A1 | 6/2003 | Elsegood | |
| 2005/0155750 A1 | 7/2005 | Mitchell et al. | |
| 2005/0236322 A1 * | 10/2005 | Baumann | B04B 5/005 210/435 |
| 2007/0256672 A1 | 11/2007 | Wang | |
| 2011/0203976 A1 | 8/2011 | Baker | |
| 2013/0112304 A1 | 5/2013 | Lanham et al. | |

* cited by examiner

MAGNETIC ROD GUIDE FOR A FILTER

CROSS-REFERENCE TO RELATED APPLICATIONS

This patent application is a United States National Stage Patent Application of International Patent Application No. PCT/GB2017/051947, filed Jun. 30, 2017, which in turn claims the benefit of Great Britain Patent Application No. 1611514.9, filed Jun. 30, 2016. The entire disclosures of the above patent applications are hereby incorporated herein by reference.

FIELD

Background to the Invention

Magnetic filters are used to collect ferrous particles in suspension in piped water systems, for example, in heating systems. Large heating systems, for example, which use 2 inch (around 50 mm) or greater diameter pipe for the heating circuit(s) generally require a reasonably large filter. Filters sold under the trade mark MAGNACLEAN™ COMMERICAL, for example, fit into this category.

These filters generally take the form of a large, heavy, cast or fabricated container, with an inlet and an outlet on either side, a removable lid, and magnets extending into the container to attract and retain magnetic particles from system water as it flows through the filter. These large filters are typically connected into the heating circuit by providing a welded flange on the inlet and outlet of the filter. A similar flange can be welded onto the pipe ends to be connected, and each pipe flange is then bolted to its corresponding filter flange, some sealing material having been placed in between. A filter of this type may operate at a pressure of up to, for example, 10 bar.

The magnets are provided as magnetic rods, constructed from a number of smaller magnets held in a stack. The magnets are sleeved into the filter from the lid in steel tubes, which depend from the underside of the lid and protect the magnets from damage and degradation. Typically, there may be an array of five magnetic rods extending from the lid of the filter into the filtering chamber within.

In order to service the filter, it is usual practice to remove the lid to be able to clean off the magnetite build up on the sleeves. A problem in carrying out this servicing is that the lid carrying the magnets is fairly heavy. The lid is typically a stainless steel plate of up to 10 mm in thickness. A handle may be provided on the lid to aid its' removal. Lifting points in the form of D links or the like may also be provided around the lid, should mechanical assistance be required. Also, the filter pot is generally magnetic and this can add significantly to the force required to remove the lid. If the filter is not at, for example, ground level, but is at chest height or above, it can be extremely difficult, or even impossible to remove the lid without some sort of mechanical assistance. This can add significantly to the costs of servicing.

Another problem is that if the seals around the top of the magnets break down, then heating system water can rust the magnets themselves, making them less effective or substantially ineffective over time.

It is an object of the invention to reduce or substantially mitigate these problems.

Statement of Invention

According to a first aspect of the present invention, there is provided a magnetic rod guide for a filter comprising a base for attachment to a part of a filter, a through aperture through which a magnetic rod can move, and resilient engagement means including at least one resilient latch for holding the magnetic rod in one or more fixed positions relative to the guide, the or each resilient latch further being adapted to allow movement of a magnetic rod through the through aperture in either direction, for insertion into the filter or withdrawal from the filter into one of the fixed positions.

The magnetic rod guide is intended to be fastened to a lid of a filter in alignment with magnet sleeves extending beneath the lid (to the other side of the lid) with an aperture extending through the lid for inserting and retracting the magnetic rod. By being able to move the magnetic rod in and out of the filter, the magnetic attraction force between the filter body or chamber and the rod can be reduced, therefore reducing the force required to remove the lid. Furthermore, for general servicing, i.e. removal of debris from within the filter, the lid need not be removed, because the magnetic attraction force provided by the magnetic rods can be removed from the filter chamber and the filter flushed through.

At least fixing two apertures may be provided in the base for receiving fixing means. Three or four fixing apertures may be provided. Ideally, the magnetic rod guide is bolted to the filter lid.

A seal is preferably provided for sealing the base to the filter. The seal prevents water lying on top of the filter lid from running down into the magnet sleeves. The magnetic rod guides stand proud on top of the lid and by being sealed to the lid, the likelihood of water entering the sleeves is considerably reduced, thus reducing the risk of corrosion of the magnets.

A body may extend away from the base, the through aperture extending through the body.

The through aperture may be substantially circular.

The resilient locking means includes at least one resilient latch. The or each resilient latch may be formed in the body and have a projection extending inwardly of the body for engagement in a recess in the magnetic rod.

Preferably the projection of the or each resilient latch is "V" shaped, the tip of the "V" shape extending inwardly of the body. By having a "V" shaped latch, the latch can act in both directions, i.e. it latches and releases when a magnetic rod is moved in both directions relative to the latch.

The or each resilient latch may extend substantially parallel to a central axis of the body and a plurality of resilient latches may be spaced around the body.

Preferably three resilient latches are spaced around the body. The magnetic rods are reasonably heavy and by having three latches spaced, preferably equi-spaced, around each rod, the resilient grip force is sufficient to effectively hold and take the weight of the rod.

Reinforcing webs may extend between the base and the body, which support the body against the opposing and opposite spring forces.

The magnetic rod guide may be made from plastics and is preferably integrally moulded.

According to a second aspect of the present invention, there is provided an assembly of a magnetic rod and a magnetic rod guide in accordance with the first aspect of the invention, the magnetic rod being substantially cylindrical and sized to slide through the aperture in the guide and having one or more co-operating engagement means for engaging with the resilient engagement means of the guide, one end of the magnetic rod including a handle portion to one side of the magnetic rod guide, for use in moving the magnetic rod through the guide, in use the magnetic rod being movable relative to the magnetic rod guide into a position where the magnetic rod is held by the resilient engagement means, and where at least one magnet in the magnetic rod is disposed to the same side of the magnetic rod guide as the handle portion.

The co-operating engagement means of the magnetic rod may include a lower circumferential groove positioned towards a lower end of the magnetic rod and an upper circumferential groove positioned towards an upper end of the magnetic rod.

The positioning of the grooves is such that the magnetic rods can be held substantially out of the body of the filter and within the body of the filter.

The upper and lower circumferential grooves may be "V" shaped, providing angled faces outwardly of the magnetic rod sloping upwardly and downwardly of the centre of each groove. With regard to the shape of the latches, this facilitates operation of the latches in both directions of movement, allowing release and re-engagement from both directions. The magnetic rods can be removed in their entirety from the filter, if desired.

The handle portion may be provided at the upper end of the magnetic rod enabling manual longitudinal movement of the rod.

The magnetic rod includes a plurality of magnets stacked one on top of the other, separated by ferrous metal spacers and held together about a central bar.

According to a third aspect of the present invention, there is provided a magnetic filter comprising a filter chamber, an inlet and an outlet and at least one assembly of a magnetic rod and magnetic rod guide in accordance with the second aspect of the invention.

A plurality of magnetic rod and magnetic rod guide assemblies may be fitted to the filter, preferably to a lid of the filter.

According to a fourth aspect of the present invention, there is provided method of cleaning the filter according to the third aspect of the invention comprising isolating the inlet and outlet valves on either side of the filter, pulling on the or each magnetic rod in turn to move it out of the or each respective magnetic rod guide to a position where it extends above the filter lid and is releasably held by the resilient engagement means, opening a drain of the filter and re-opening one of the valves to flush any debris collected in the filter out of the drain.

The ability to withdraw each magnetic rod and to hold it in an inoperative position enables the magnetic force to be removed from the magnet sleeves allowing the magnetite and other debris to be washed away through the filter drain.

DESCRIPTION OF THE DRAWINGS

For a better understanding of the invention, and to show more clearly how it may be carried into effect, a preferred embodiment will now be described with reference to the accompanying drawings, in which.

DESCRIPTION OF THE EMBODIMENT

Figure 1:
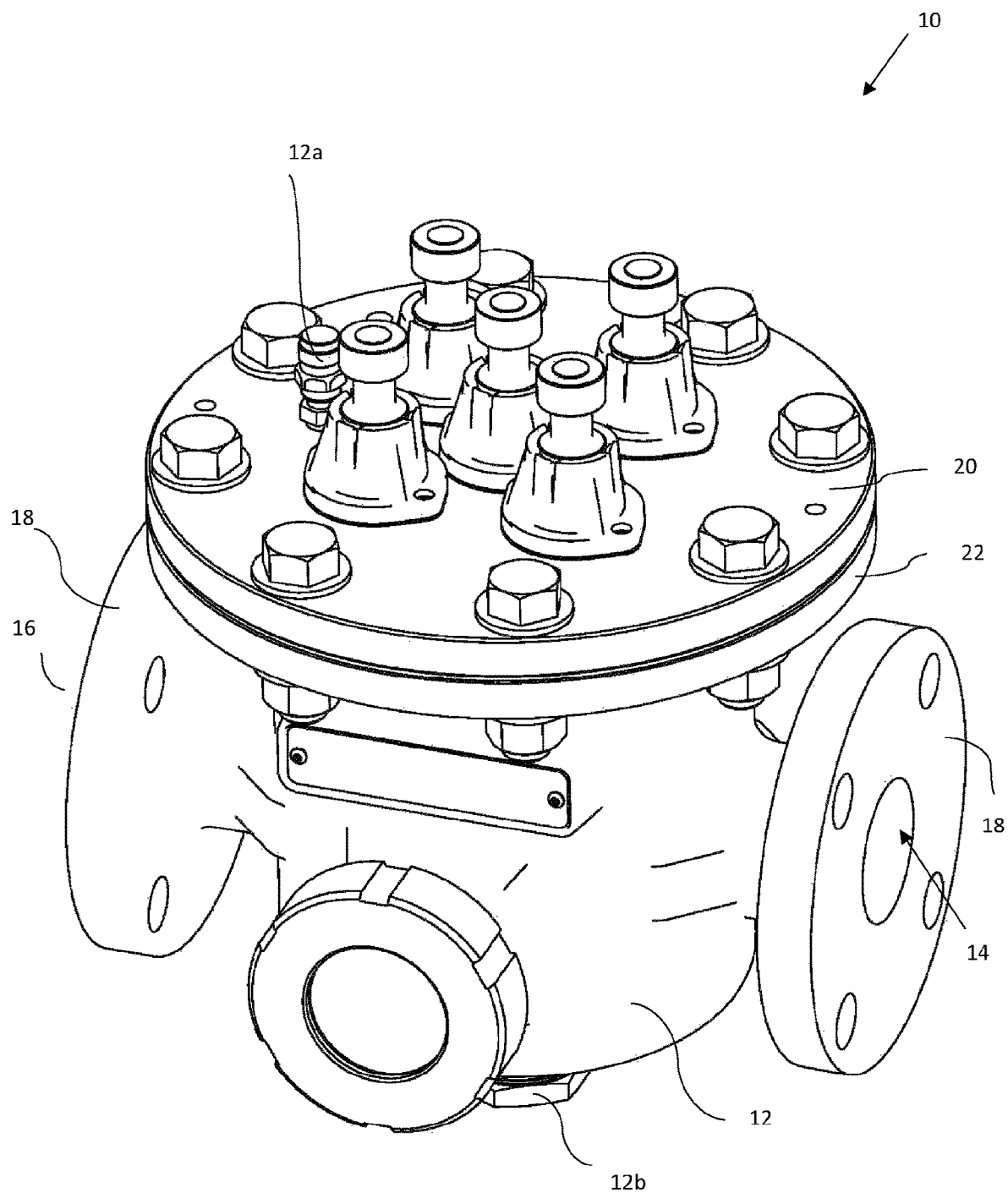
FIG. 1 is a perspective view of a magnetic filter having five magnetic rods held in magnetic rod guides of the invention, with the magnetic rods in an operable position within the filter.

Referring firstly to FIG. 1, a magnetic filter is indicated generally at 10. The filter 10 has a body 12, typically manufactured as a cast pot. The body 12 includes a chamber. An inlet 14 and an outlet 16 are provided on either side of the body 12, but flow direction is unimportant and the filter can be positioned in a flow pipe in either orientation. In use, valves, not shown, are position on either side of the filter so that it can be isolated from a heating circuit. The inlet and outlet 14, 16 are each formed by circular flange 18 bounding a circular aperture in communication with the inside of the body 12. The filter is intended to be used in a hot water heating system and has an operating pressure of up to 10 bar. The filter 10 includes a bleed valve 12a and a drain 12b.

Figure 5:
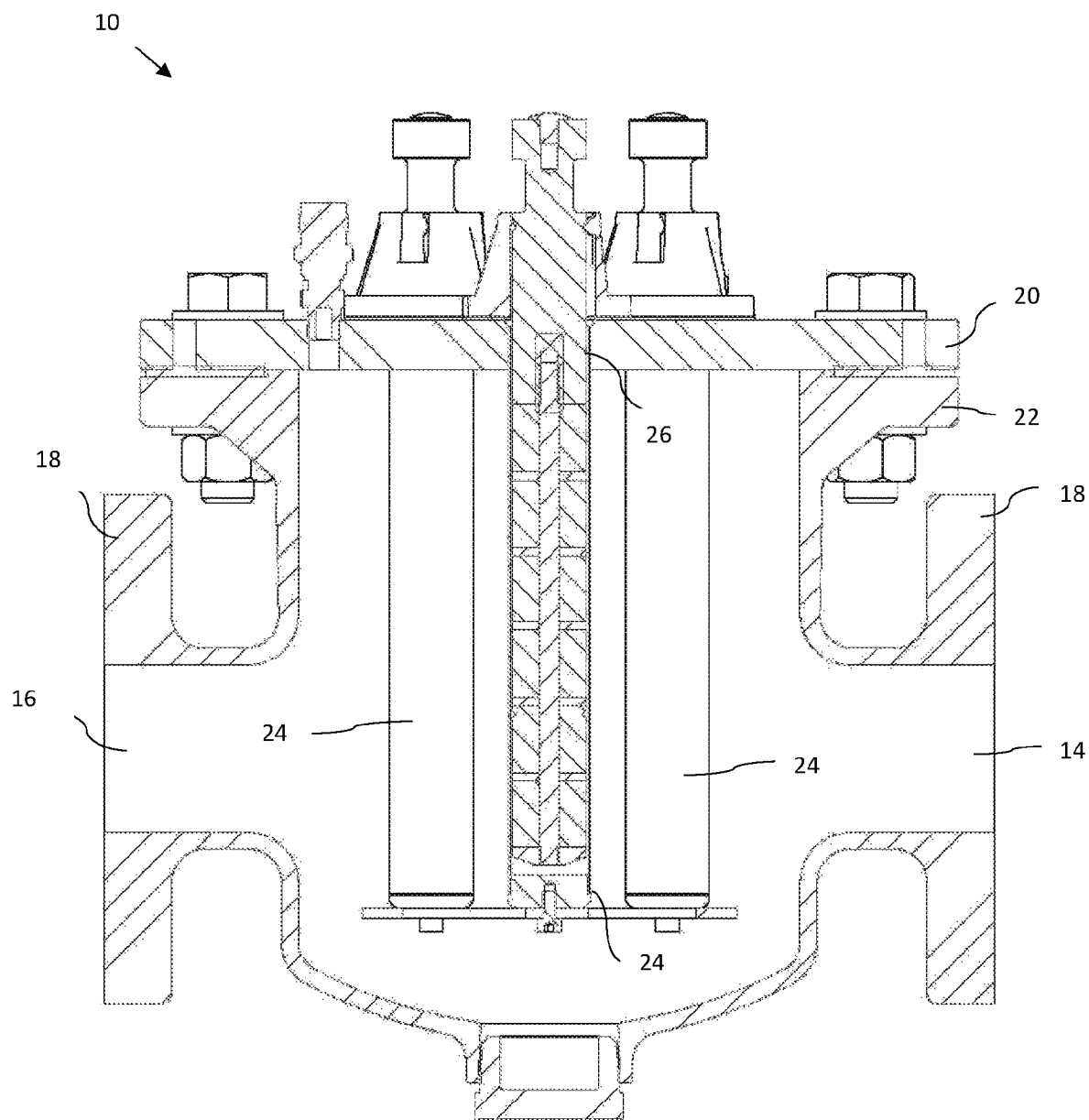
FIG. 5 is a cross-section through the magnetic filter of FIG. 1, with the magnetic rods in an operable position within the filter.

A lid 20 of the filter 10 is provided in the form of a circular plate, which is bolted to a circular flange 22 provided at the top of the filter 10. A rubber seal (not shown) sits between the lid 20 and flange 22. Referring in particular to FIG. 5, magnet sleeves 24 with closed lower ends are welded to the underside of the lid 20. An aperture 26 is provided through the lid 20 for each sleeve 24, at the points where each sleeve 24 is sealed to the lid 20.

Each sleeve 24 is spaced from its neighbouring sleeves 24. Each sleeve 24 is in the form of a tube with a closed end. Each sleeve 24 is made of steel in this embodiment. The closed end of each sleeve 24 is spaced from the bottom of the chamber in the filter 10. A plate is connected to the closed ends of the sleeves 24.

Figure 3:
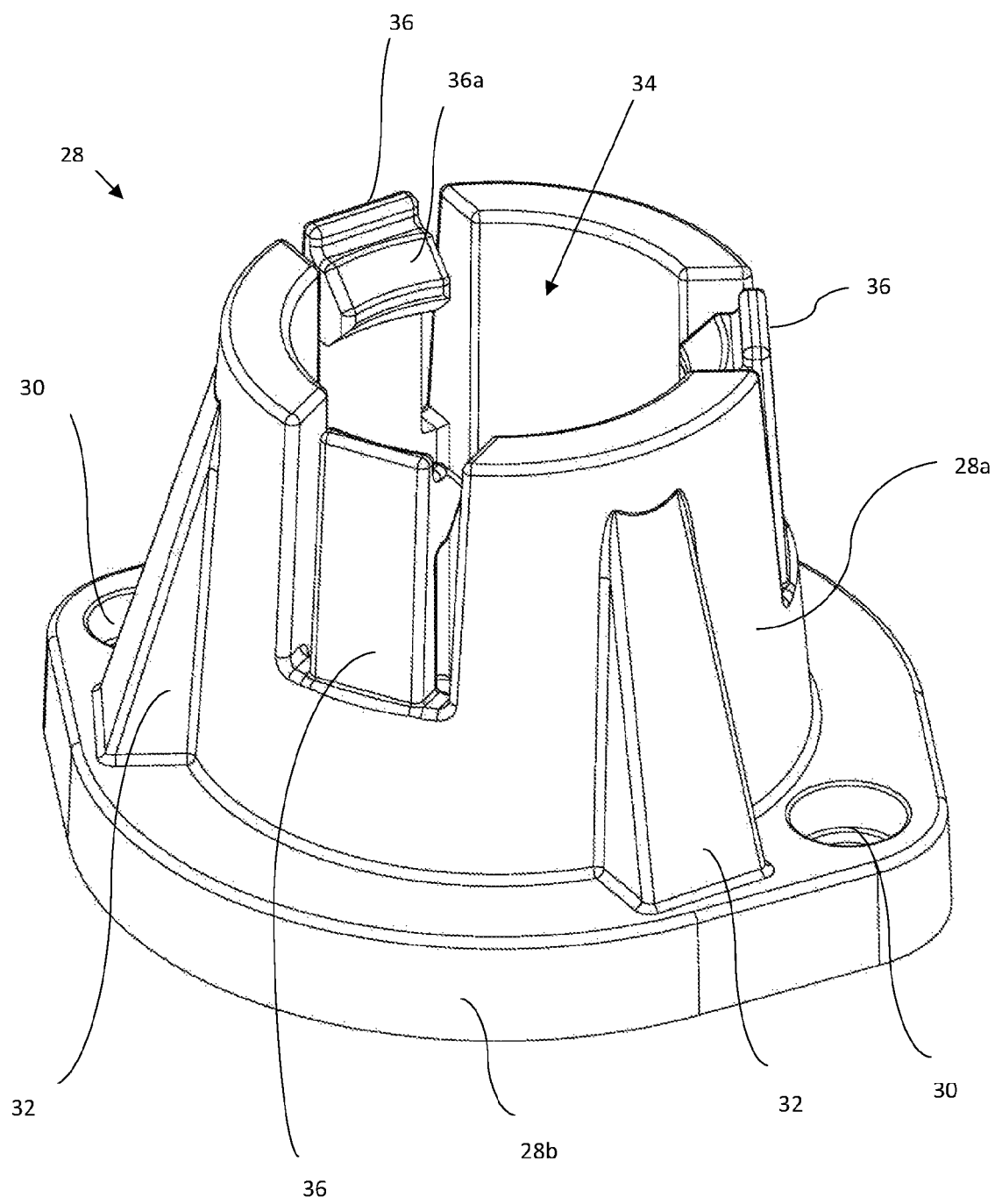
FIG. 3 is a perspective view of an example of magnetic rod guide.

In this embodiment, a guide 28 for a magnetic rod is provided over each aperture 26. In total, there are five guides 28. An enlarged view of a magnetic rod guide 28 is shown in isolation in FIG. 3. In this embodiment, each magnetic rod guide 28 is substantially identical and integrally moulded from plastic. Other materials may be used in alternative embodiments.

Each magnetic rod guide has a body 28a with a base 28b. The body 28a extends upwardly from the base 28b. Holes 30 through the base 28b allow the magnetic rod guide to be bolted or otherwise fixed to the lid 20. The holes 30 are provided on opposite sides of the base 28b. It is envisaged that more than two fixing holes 30 may be provided, for example, three or four fixing holes spaced around the base, for example, equi-spaced around the base. Reinforcing columns or webs 32 are spaced equidistantly around the body 28a for support. A third reinforcing web 32 is hidden behind the body 28a in FIG. 3. A seal (not shown) is provided between the base 28b and the lid 20, preventing water from leaking into the magnet sleeve 24.

Each magnetic rod guide 28 includes a through aperture 34, extending through the body 28a and base 28b, for receiving a magnetic rod. The through aperture 34 is circular in cross-section. The through aperture 34 is essentially a cylindrical bore extending along an axis of the body 28a. Resilient latches 36 are disposed around the periphery of the through aperture 34 for releasably engaging the magnetic rod. A V-shaped projection or detent 36a is provided near the end of each latch 36, facing inwardly to engage corresponding portions of the magnetic rod. The latches 36 are each positioned between the reinforcing webs 32.

Each latch 36 is connected to the body 28a at its lower end, allowing outward flexing when a magnetic rod moves through the through aperture 34 in either direction. The sides of the latch 36 are spaced from the body 28a, so each latch 36 is free to pivot about its lower end when a magnetic rod is inserted or retracted through the guide 28. The top of each latch 36 is substantially at the same height as the top of the body 28a, but may be lower than the height of the body 28a.

Each V-shaped detent 36a has a chamfered end to lower friction against the magnetic rod. Similarly, each V-shaped detent 36a is inwardly curved. Together, the curves of the detents 36a of the latches 36 collectively define arc portions of an incomplete circle, which complement the shape of the magnetic rod. The latches 36 are sufficiently resistant to flexing that they can support the weight of a magnetic rod without the rod slipping past the latches 36.

Figure 2:
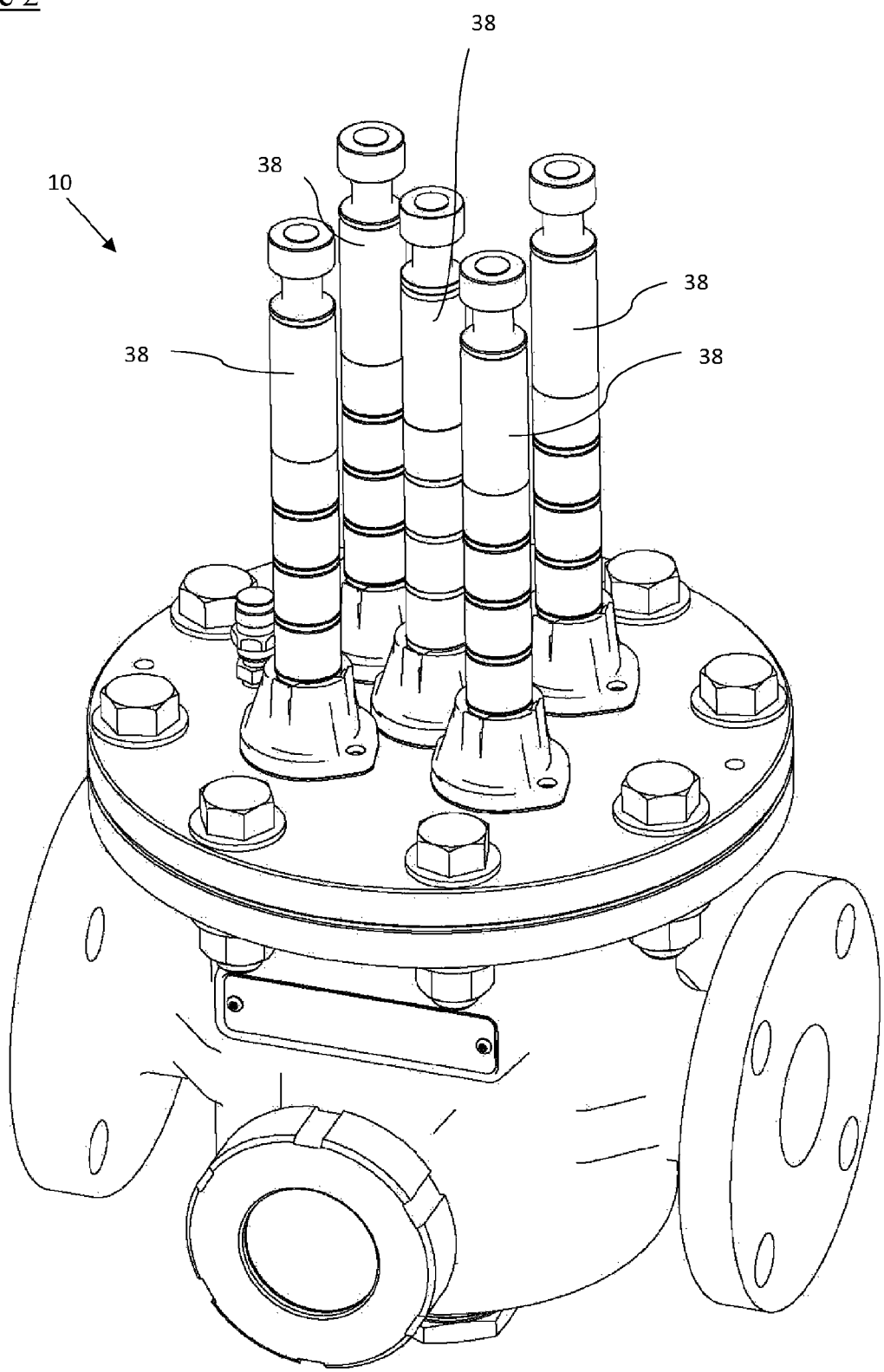
FIG. 2 is perspective view of the magnetic filter of FIG. 1, with the magnetic rods in a retracted position for cleaning of the filter.
Figure 6:
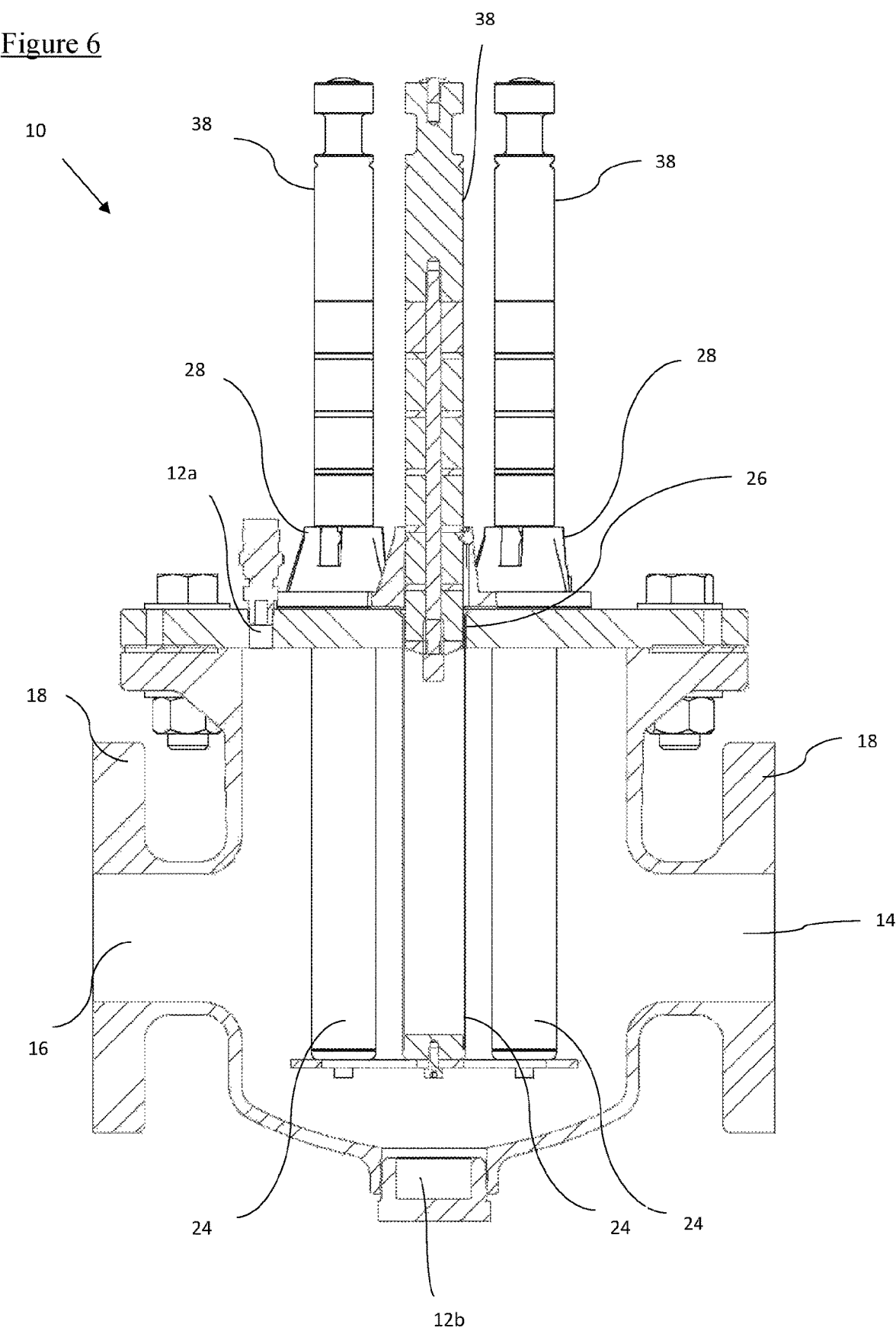
FIG. 6 is a cross-section through the magnetic filter of FIG. 1, with the magnetic rods in a retracted position for cleaning of the filter.

Magnetic rods 38 are insertable into the filter 10, as seen in FIGS. 1 and 5. The magnetic rods 38 can be retracted from the filter 10, as seen in FIGS. 2 and 6. Five magnetic rods 38 are provided in a cross arrangement in this embodiment. The cross is positioned on a substantially central axis of the filter 10.

Figure 4:
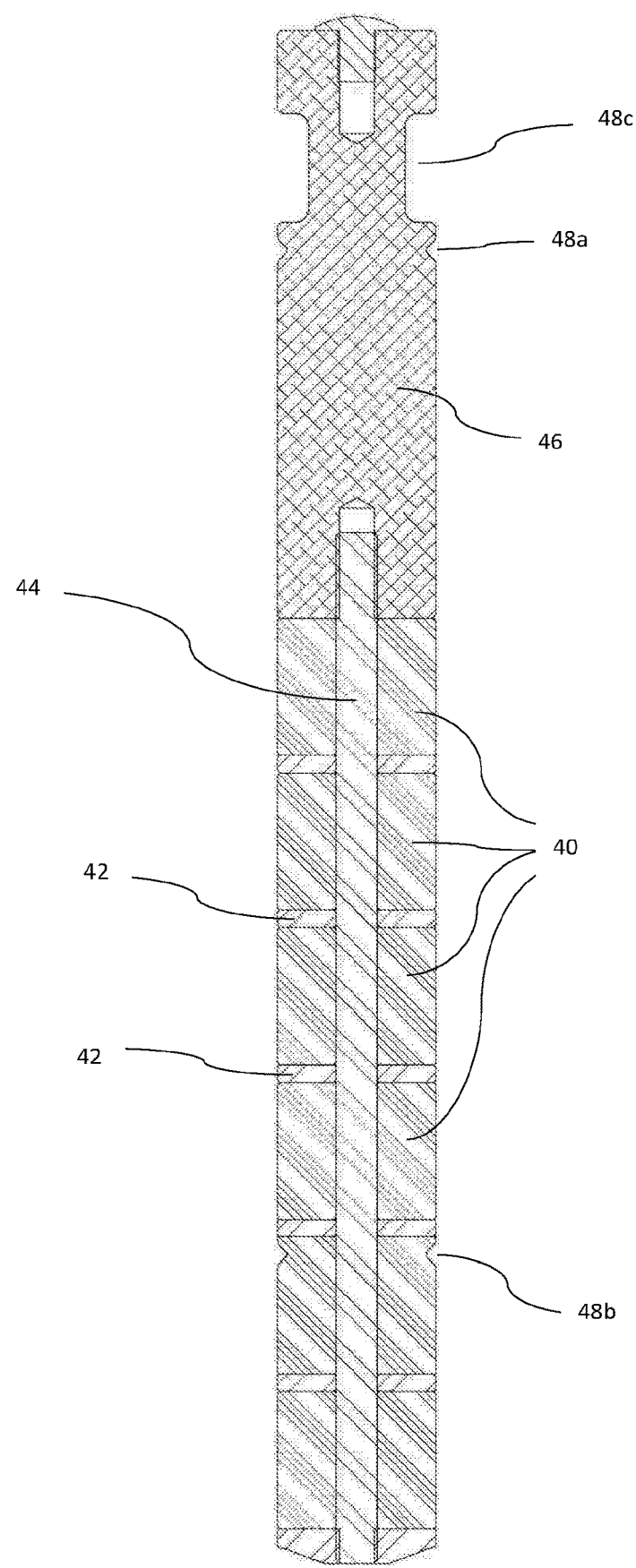
FIG. 4 is a cross-section through a magnetic rod suitable for use with the magnetic rod guide of FIG. 3.

A magnetic rod 38 is shown in isolation in FIG. 4. The rod 38 includes a stack or column of magnets 40 separated by ferrous metal spacers 42. The magnets 40 are secured to a central bar 44. A handle 46 is provided at the top of the rod 38 for pulling the rod 38 out of the filter 10, and also pushing the rod 38 back into the filter 10. The central bar 44 partially extends into the handle 46.

Annular or circumferential grooves are provided around each rod 38. These grooves allow for each magnetic rod 38 to be fixed in different positions relative to its magnetic rod guide 28. One groove 48a is provided on the handle 46. A second groove 48b is provided near the opposite end of the rod 38, in the lower quartile of the rod. In this embodiment, the groove 48b is inset from the end, and indents the second magnet 40 from the end. It may indent the third magnet from the end. Both grooves 48a, 48b are substantially V-shaped. The grooves 48a, 48b therefore have complementary shapes to the detents 36a of the latches 36 of the magnetic rod guide 28. The upper groove 48a sits against the detents 36a when the magnetic rod 38 is provided inside the filter 10, in an operative position. The lower groove 48b sits against the detents 36a when the magnetic rod has been retracted from the filter 10.

The handle 46 also includes another annular groove 48c. This provides a surface facing towards the lid 20 which aids gripping of the handle 46 when retracting the magnetic rod 38 from the filter 10. Alternatively, a plurality of grooves may be provided to improve grip of the handle.

In use, the filter 10 is provided as part of a central heating system. During operation of the system, magnetic impurities are filtered from the water in the system and accumulate around the sleeves 24 due to the inserted magnetic rods 38. To clean the filter, the filter is first isolated by closing valves either side of the filter. The magnetic rods 38 can be retracted from the filter 10 through the respective apertures 26 in the lid 20. The sleeves do not then have magnets inside them. The magnetic rod guides 28 are bolted to the lid 20 and do not retract with the rods 38.

Each magnetic rod 38 is retracted from the filter 10 by pulling on the respective handle 46. This force causes the groove 48a to bear against angled faces of the detents 36a of the retaining latches 36. The latches 36 are flexed outwardly from the rod 38 as a result, allowing the detents 36a to exit the groove 48a. The rod 38 then moves upwardly along a central axis of the magnetic rod guide 28, with the latches 36 held outwardly flexed as the V-shaped detents 36a run over the surface of the rod 38. When retracted sufficiently, the latches 36 are able to relax into the lower groove 48b, engaging the magnetic rod 38 and holding it in a retracted position, outside the filter 10. Repeating this for each magnetic rod 38 gives rise to an arrangement similar to those of FIGS. 2 and 6. If necessary, the rods 38 can be pulled further and deliberately removed from the lid 20, pulling the rod 38 free of the latches 36.

With the rods 38 retracted, the drain 12b is opened and one of the valves to the filter is opened to flush water through the filter and out of the drain. This process washes the magnetite and other impurities which have built up off the sleeves and out of the drain. The rods 38 remain securely in place on the lid 20 due to the guides 28, unless deliberately removed as mentioned above. When cleaning is complete, the valve can be closed, the drain 28b closed and the valves both sides re-opened. Air can be bled off through the bleed valve. The rods 38 can then be inserted back into the sleeves 24 of the filter by pushing them in the opposite direction to that used for retracting the rods 38, in the reverse operation. The latches 36 flex outwardly from the lower groove 48b and re-engage the upper groove 48a when sufficiently inserted. In this way, the lid need never be removed from the filter and the filter can be simply flushed through with the magnetic attraction temporarily removed.

The embodiments described above are provided by way of example only, and various changes and modifications will be apparent to persons skilled in the art without departing from the scope of the present invention as defined by the appended claims.

The invention claimed is:
1. A magnetic filter comprising:
a filter chamber;
an inlet and an outlet; and
at least one assembly of a magnetic rod and a magnetic rod guide, the magnetic rod being cylindrical and sized to slide through an aperture in the magnetic rod guide;
wherein the magnetic rod includes:
one or more co-operating engagement means for engaging with a resilient engagement means of the magnetic rod guide, the co-operating engagement means including a lower circumferential groove positioned towards a lower end of the magnetic rod and an upper circumferential groove positioned towards an upper end of the magnetic rod;
a handle portion to one side of the magnetic rod guide, for use in moving the magnetic rod through the magnetic rod guide, in use the magnetic rod being movable relative to the magnetic rod guide into a position where the magnetic rod is held by the resilient engagement means; and
wherein the magnetic rod guide includes:
a base for attachment to a part of the filter;
the aperture through which the magnetic rod can move; and
the resilient engagement means includes at least one resilient latch releasably holding the magnetic rod in one or more fixed positions relative to the magnetic rod guide, the at least one resilient latch adapted to allow movement of the magnetic rod through the aperture in either direction, for insertion into the filter or withdrawal from the filter into one of the fixed positions.

2. The magnetic filter of claim 1, in which a plurality of magnetic rod and magnetic rod guide assemblies are fitted to the filter.

3. The magnetic filter of claim 2, in which the plurality of magnetic rod and magnetic rod guide assemblies are fitted to a lid of the filter.

4. The magnetic filter of claim 1, wherein a seal is provided for sealing the base to the filter.

5. The magnetic filter of claim 1, wherein a body extends away from the base, the through aperture extending through the body.

6. The magnetic filter of claim 4, wherein the through aperture is circular.

7. The magnetic filter of claim 5, wherein the or each resilient latch is a formed in the body and has a projection extending inwardly of the body for engagement in a recess in the magnetic rod.

8. The magnetic filter of claim 7, wherein the projection of the or each resilient latch is "V" shaped, the tip of the "V" shape extending inwardly of the body.

9. The magnetic filter of claim 5, wherein the or each resilient latch extends parallel to a central axis of the body.

10. The magnetic filter of claim 5, wherein a plurality of resilient latches is spaced around the body.

11. The magnetic filter of claim 10, wherein three resilient latches are spaced around the body.

12. The magnetic filter of claim 5, wherein reinforcing webs extend between the base and the body.

13. The magnetic filter of claim 1, wherein the magnetic rod guide is made from plastics.

14. The magnetic filter of claim 1, wherein the upper and lower circumferential grooves are "V" shaped, providing angled faces outwardly of the magnetic rod sloping upwardly and downwardly of the centre of each groove.

15. The magnetic filter of claim 1, wherein the handle portion is provided at the upper end of the magnetic rod.

16. The magnetic filter of claim 1, wherein the magnetic rod includes a plurality of magnets stacked one on top of the other, separated by ferrous metal spacers and held together about a central bar.

* * * * *